United States Patent [19]

Vaughan et al.

[11] 4,248,739

[45] Feb. 3, 1981

[54] STABILIZED PILLARED INTERLAYERED CLAYS

[75] Inventors: David E. W. Vaughan, Columbia; Roger J. Lussier; John S. Magee, Jr., both of Ellicott City, all of Md.

[73] Assignee: W. R. Grace & Co., New York, N.Y.

[21] Appl. No.: 71,957

[22] Filed: Sep. 4, 1979

Related U.S. Application Data

[63] Continuation-in-part of Ser. No. 885,408, Mar. 10, 1978, Pat. No. 4,176,090, which is a continuation-in-part of Ser. No. 805,672, Jun. 13, 1977, abandoned, which is a continuation-in-part of Ser. No. 704,358, Jul. 12, 1976, abandoned, which is a continuation-in-part of Ser. No. 633,053, Nov. 18, 1975, abandoned.

[51] Int. Cl.³ .......................... B01J 20/16; B01J 21/16
[52] U.S. Cl. .............................. 252/455 R; 252/432; 423/328
[58] Field of Search .............. 252/455 R, 455 Z, 432; 423/327, 328

[56] References Cited

U.S. PATENT DOCUMENTS

| | | | |
|---|---|---|---|
| 3,884,835 | 5/1975 | Vaughan | 252/432 X |
| 3,887,454 | 6/1975 | Hickson | 252/455 R |
| 3,909,861 | 10/1975 | Reinhardt et al. | 252/442 X |
| 4,024,171 | 5/1977 | McArthur | 252/432 X |
| 4,060,480 | 11/1977 | Reed et al. | 208/111 X |
| 4,176,090 | 11/1979 | Vaughan et al. | 252/455 R |

*Primary Examiner*—Carl F. Dees
*Attorney, Agent, or Firm*—Arthur P. Savage

[57] ABSTRACT

Stable pillared interlayered clays are prepared by reacting smectite clays with high molecular weight cationic metal complexes of metals such as aluminum and zirconium. The high molecular weight complexes are prepared by hydrolysis of copolymerization of a metal complex such as aluminum chlorohydrol. The pillared, interlayered clays possess a high degree of thermal and hydrothermal stability and may be used in the preparation of catalysts and sorbents.

11 Claims, No Drawings

STABILIZED PILLARED INTERLAYERED CLAYS

This application is a continuation-in-part of our application Ser. No. 885,408, filed Mar. 10, 1978 now U.S. Pat. No. 4,176,090, which is a continuation-in-part of Ser. No. 805,672 filed June 13, 1977, now abandoned, which is a continuation-in-part of application Ser. No. 704,358 filed July 12, 1976, now abandoned, which is a continuation-in-part of application Ser. No. 633,053 filed Nov. 18, 1975, now abandoned, the subject matter of which is incorporated by reference herein.

The present application relates to the preparation of pillared interlayered clay compositions, and more specifically, to pillared interlayered clay compositions which possess a particularly high degree of thermal and hydrothermal stability.

In our copending application, Ser. No. 885,408 filed Mar. 10, 1978 we have disclosed pillared interlayered clay products that possess a uniform micropore structure in which more than half the surface area is located in pores less than about 30 angstroms in diameter. Our pillared interlayered clays are further characterized by an interlayer distance of about 6–16 angstrom units and a surface area on the order of from about 150 to 600 m$^2$/g.

These pillared interlayered clay compositions are prepared by reacting a smectite-type clay, such as bentonite, with an aqueous solution of a polymeric cationic hydroxy inorganic metal complex, such as chlorohydrol. The resulting product after dehydration comprises a smectite clay which includes an inorganic oxide such as alumina between the layers thereof. The inorganic oxide is present in the form of pillars which separate and support the clay layers at a uniform distance of from about 6–16A°.

While pillared interlayered clay compositions are inorganic structures which inherently possess a high degree of thermal stability, it is contemplated that the hydrothermal stability of these compositions may be improved through use of polymeric metal complexes which possess an optimum molecular weight and chemical composition.

It is therefore an object of the present invention to provide methods by which pillared interlayered clays having a particularly high degree of thermal and hydrothermal stability may be prepared.

It is another object to provide pillared interlayered clays which find wide application as hydrocarbon conversion catalysts and sorbents.

These, and still further objects of the present invention will become readily apparent to one skilled in the art in the following detailed description and specific examples.

Broadly, our invention contemplates the preparation of pillared interlayered clays wherein a smectite clay is reacted with a solution of a polymeric cationic hydroxy inorganic metal complex having a molecular weight in excess of about 2000.

More specifically, we have found that the thermal and hydrothermal stability of pillared interlayered clays may be improved by reacting a smectite with a polymeric cationic hydroxy inorganic metal complex or copolymer thereof having a molecular weight in excess of from about 2,000 to about 20,000 which is prepared by the following techniques:

1. An aqueous solution of a polymeric cationic hydroxy inorganic metal complex having an initial molecular weight of about 500 to 1,200 was heated at a temperature of about 50° to 100° C., preferably at reflux for 1 to 48 hours. The hydrolysis-polymerization reaction which occurs in the case of chlorhydrol is illustrated as follows:

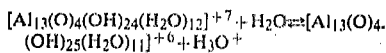

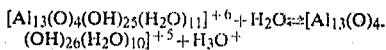

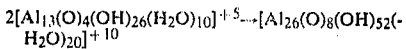

2. An aqueous solution of polymeric cationic hydroxy inorganic metal complex is reacted with a base or base forming reactant, such as ammonium hydroxide, sodium hydroxide or magnesium metal at a pH of about 0.5 to 6.0 for a period of 0.1 to 48 hours. The base catalyzed hydrolysis-polymerization which occurs in case of chlorhydrol/ammonium hydroxide may be illustrated as follows:

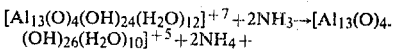

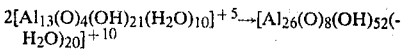

3. An aqueous solution of a polymeric cationic hydroxy inorganic metal complex is reacted with a copolymerizing reactant such as $SiO_3^{-2}$, $ZrO^{+2}$ or $BO_3^{+3}$.

The clays used as starting materials in the present invention are included in the group of minerals generally referred to smectite type clays and represented by the general formula $(Si_8)^{IV}(Al_4)^{VI}O_{20}(OH)_4$ where the IV designation indicates an ion coordinated to four other ions, and VI designates an ion coordinated to six other ions. The IV coordinated ion is commonly $Si^{4+}$, $Al^{3+}$ and/or $Fe^{3+}$, but could also include several other four coordinate ions (e.g., $P^{5+}$, $B^{3+}$, $Ge^{4+}$, $Be^{2+}$, etc.). The VI coordinated ion is commonly $Al^{3+}$ or $Mg^{2+}$, but could also include many possible hexacoordinate ions (e.g. $Fe^{3+}$, $Fe^{2+}$, $Ni^{2+}$, $Co^{2+}$, $Li^+$, etc.). The charge deficiencies created by the various substitutions into these four and six coordinate cation positions are balanced by one or several cations located between the structural units. Water may also be occluded between these structural units, bonded either to the structure itself, or to the cations as a hydration shell. When dehydrated, the above structural units have a repeat distance of about 9 to 12A° measured by X-ray diffraction. Typical commercially available clays include montmorillonite, bentonite, beidellite and hectorite.

The polymeric cationic hydroxy inorganic metal complexes which are hydrolized-polymerized or copolymerized to form the high molecular weight inorganic metal polymers used to prepare the pillared interlayered clays of the present invention are basic aluminum and zirconium complexes which are formed by the hydrolysis of aluminum and zirconium salts. The initial inorganic aluminum polymers used to prepare our high molecular weight complexes have the general formula $Al_{2+n}(OH)_{3n}X_6$ wherein n has a value of about 4–12; and X is usually Cl, Br and/or $NO_3$. These inorganic metal polymers are generally believed to have an average molecular weight on the order of from about 500 to 1200.

The initial zirconium complexes used in the preparation of high molecular weight polymers used in the practice of our invention possess the following general formula:

$$[Zr_4(OH)_{12}(H_2O)_{12}]^{+4}$$

The preparation of the above noted aluminum and zirconium polymers is generally known to those skilled in the art and disclosed in the following references:

(a) Tsutida and Kobayashi: J. Chem. Soc. Japan (Pure Chem. Sec.), 64, 1268 (1943) discloses the reaction of solutions of AlCl₃.6H₂O or HCl with an excess of metallic aluminum;

$$nAl + 2AlX_3 \xrightarrow{H_2O} Al_{2+n}(OH)_{3n}X_6$$

(b) Inove, Osugi and Kanaya: J. Chem. Soc. Japan (Ind. Chem. Sec.), 61, 407 (1958) discloses that more than an equivalent amount of aluminum hydroxide is reacted with an acid;

$$2 + nAl(OH)_3 + 6HX \xrightarrow{H_2O} Al_{2+n}(OH)_{3n}X_6$$

(c) H. W. Kohlschuter et al.: Z. Anorg. Allgem. Chem., 248, 319 (1941) describes a method wherein alkali is added to an aluminum salt solution;

$$2 + nAlX_3 + 3nMOH \xrightarrow{H_2O} Al_{2+n}(OH)_{3n}X_6 + 3MMX$$

(d) T. G. Cwe Berg: Z. Anorg. Allgem. Chem., 269, 213 (1952) discloses a procedure wherein an aqueous solution of AlX₃ is passed through an ion exchange column in OH⁻ form, and (e) R. Brun: German Pat. No. 1,102,713 describes extended heating at ~150° C. of salts such as AlCl₃.6-H₂O.

(f) A. Clearfield and P. A. Vaughan, Acta Cryst. 9, 555 (1956);

(g) A. N. Ermakov, I. N. Marov, and V. K. Belyaeva, Zh. Neorgan. Khim. 8 (7), 1923 (1963).

(h) G. M. Muha and P. A. Vaughan, J. Chem. Phys. 33, 194-9, (1960).

As indicated above, the high molecular weight metal complexes used to obtain the thermal pillared interlayered clays of the present invention are obtained by increasing the molecular weight of the above noted aluminum and zirconium complexes through hydrolysis-polymerization or copolymerization.

To polymerize an initial polymer having a molecular weight of below about 1200, an aqueous solution of the polymer may be heated for a time sufficient to increase molecular weight to a level of at least about 2000 to about 20,000. In general it is found that an aqueous solution of the polymer which contains from about 0.1 to 10 percent solids may be heated at a temperature of from about 50° to 100° C. for a period of 0.1 to 48 hours.

Furthermore, it is contemplated that the hydrolysis-polymerization may be conducted in the presence of a base which increases the pH of the reaction mixture to a pH of about 0.5 to 2.0 for zirconium polymers and a pH range of 3.5 to 6.0 for aluminum polymers. Bases such as ammonium hydroxide and sodium hydroxide or a base forming reactant such as magnesium metal are added to a heated solution of the metal complex in amounts ranging from about 0.5 to 3 equivalents of base per equivalent of complex. Where the hydrolysis-polymerization reaction is conducted in the presence of a base the solutions are reacted at a temperature of from about 50° to 100° C. for a period of from about 0.1 to 24 hours.

It is also contemplated that the high molecular weight polymers may be prepared by copolymerizing an aluminum or zirconium metal complex with a copolymerizing reactent such as $SiO_3^{-2}$, $ZrO_2^{+2}$ or $BO_3^{+3}$ which may be included in the reaction mixture as sodium silicate, zirconium chloride, boric acid or sodium borate. Polymers having a suitable molecular weight are obtained by reacting from about 0.05 to 1.0 mols of copolymerizing reactant with each mol of starting low molecular weight complex. The reactions are conducted in aqueous solutions which contain up to 25 percent by weight solids and are conducted at temperatures on the order of 50° to 100° C. for periods of 0.1 to 24 hours.

To obtain the stable pillared interlayered clay products of our invention, the following general procedure may be used:

1. A smectite clay is mixed with an aqueous solution of the high molecular weight polymeric cationic hydroxy metal complex, polymer or copolymer in amounts wherein the weight ratio of clay to metal complex is from 3 to 1. A metal complex solution is used which preferably contains from about 1 to 40 percent by weight solids in a suitable liquid medium such as water.

2. The mixture of clay and metal complex is maintained at a temperature of from about 5° to 200° C. for a period of about 0.1 to 4.0 hours.

3. The reacted clay solids are recovered from the reacted mixture and heated to a temperature of from about 200° to 700° C. to decompose the metal complex and to form a pillar of inorganic oxide.

The calcined interlayered clay products of our invention will have an interlayer spacing of from about 6-16 angstroms, a nitrogen BET surface area of from about 150-600 m²/g and a nitrogen pore volume of from about 0.1 to about 0.6 cc/g. Furthermore, our novel pillared interlayered clay compositions possess a substantial internal micropore structure. The pore structure is characterized by a pore size distribution in which more than 50 percent, in many cases more than 75 percent of the surface area is located in pores less than 40A° in diameter as determined by conventional nitrogen pore size distribution (PSD) adsorption measurements.

Our interlayered clay products find utility as sorbents, catalysts, and catalytic supports. Furthermore, it is found that the pillared, interlayered clay products may be combined with other inorganic oxide sorbents and catalytic components such as silica, alumina, silica-magnesia, silica-alumina hydrogel, natural and synthetic zeolites and various clays. Our products are particularly useful in the preparation of catalysts which contain metals such as platinum, palladium, cobalt, molybdenum, nickel, tungsten, and the rare earths. Furthermore, it is contemplated that the present interlayered clay products may be admixed with inorganic oxide matrix components such as silica, alumina, silica-alumina, hydrogels and clays. The resulting compositions find use as hydrocarbon conversion catalysts for use in conventional catalytic cracking, hydrocracking, hydrotreating, isomerization and reforming processes, as well as various molecular sieve separation processes.

When subjected to thermal deactivation at temperatures on the order of 760° C., the products retain from about 50 to 90 percent of their initial surface area. Subjected to hydrothermal treatment at temperatures of 675° C. in the presence of saturated steam, the surface area retention is from about 50 to 75 percent.

Furthermore, when evaluated as petroleum cracking catalysts using the procedure described by Ciapetta and Henderson, Oil & Gas Journal, Oct. 16, 1967, page 88, the compositions are found to possess a high degree of cracking activity.

Having described the basic aspects of our invention, the following specific examples are given to illustrate the preferred embodiments.

EXAMPLE 1

This example illustrates the preparation of pillared interlayer clay using a relatively low molecular weight metal complex. A pillared interlayered clay was prepared by diluting 5,445 g of a commercially available aluminum chlorhydroxide solution having a molecular weight of about 1000 and a solid content of about 30 percent to about 47.1, adding 10,000 g (dry basis) bentonite and boiling 1 hour with rapid agitation, filtering, and washing 1 time with 75 l of hot deionized $H_2O$. The filter cake reslurried in 47 l hot deionized $H_2O$, filtered, reslurried at ~22 percent solids and spray dried. The surface area was 286 $m^2/g$ and the basal spacing 17.6A°. After an 8 hour, 1250° F., 5 psi steam treatment the surface area was reduced to 107 $m^2/g$. The microactivity was 58.1 percent conversion versus 80.0 for a commercial RE-Y containing zeolite fluid hydrocarbon cracking catalyst deactivated in the same manner.

EXAMPLE 2

This example indicates the improved hydrothermal stability brought about by hydrolyzing a metal complex polymer. The aluminum chlorhydroxide solution described in Example 1 was diluted to 0.5M in $Al_2O_3$ concentration and refluxed for 48 hours. 614 ml of this solution was diluted to 2.8 l, 3 percent $NH_3$ solution was added to a pH of 5.9, and solution was aged overnight at room temperature to obtain a polymer having a molecular weight above about 3000. 87.6 ml of this solution was diluted to 500 ml, and 25.0 g (dry basis) of bentonite was added, and the slurry was boiled for one hour. The pH was readjusted to 5.5 with 3 percent $NH_4OH$, then filtered. The filter cake was washed twice with ½ l of hot deionized $H_2O$, and then oven dried. After grinding, the sample was calcined for two hours at 1000° F., steamed 8 hours at 1250° F. and 5 psi steam, and then tested in a microactivity unit. This sample retained 190 $m^2/g$ after the eight hours, 1250° F., 5 psi steam treatment, and this stability improvement is reflected in the activity of 73.6 percent conversion versus 58.1 for the unstabilized composition prepared in Example 1.

EXAMPLE 3

This example shows the improved hydrothermal stability of pillared interlayered clay when the aluminum chlorhydroxide is hydrolyzed by the addition of magnesium metal. The magnesium metal reacts with the chlorhydrol solution forming $Mg^{+2}$ and raises the pH, bringing about substantial hydrolysis and polymerization of the aluminum chlorhydroxide. 19.0 g of aluminum chlorhydroxide described in Example 2 was diluted to 400 ml; 0.22 g of magnesium metal (powder) were added and the solution was aged overnight to obtain a metal complex polymer having a molecular weight above about 2000. 25.0 g (dry basis) bentonite were added, and the slurry was boiled for 1 hour, filtered, washed twice with ½ l hot deionized water, and the filter cake oven dried. After grinding and calcining for 2 hours at 1000° F., the sample was steam deactivated 8 hours, 1250° F., 5 psi steam and tested in a microactivity unit. The high stability is reflected in improved surface area retention (209 $m^2/g$) and activity (78.4 percent conversion) relative to the unstabilized sample prepared in Example 1.

EXAMPLE 4

This preparation shows the ability of copolymerized chlorhydrol-silicate to stabilize the interlayered clays, 204 g of chlorhydrol described in Example 1 diluted to 900 ml was mixed with a 100 ml solution containing 14.6 g $Na_2O\cdot SiO_2\cdot 9H_2O$, and refluxed two hours. The resulting copolymer possessed a molecular weight above about 3000. 93 ml of this sol was diluted to ½ liter, 25.0 g (dry basis) #325 bentonite were added, and the slurry was aged 1 hour at 150° F., the product was filtered, washed twice with ½ liter of hot deionized water and oven dried. After grinding, the sample was calcined for 2 hours at 1000° F., steamed for 8 hours at 1250° F., and 5 psi steam, and then tested in a microactivity unit. The improved hydrothermal stability is reflected in the high activity of 78.7 percent conversion, similar to the 80 percent conversion obtained for a commercial RE-Y containing catalyst.

EXAMPLE 5

This preparation shows the excellent activity observed for an interlayered clay prepared with a chlorhydrol-silicate copolymer sol at a constant pH. 211 g chlorhydrol described in Example 1 were diluted to 970 ml, and 30 ml of solution containing 5.8 g of a sodium silicate solution (28.0 percent $SiO_2$, 9.8 percent $Na_2O$) were added and the solution was refluxed for 24 hours to obtain a polymer having a molecular weight above about 5000. 91 Ml of this solution were diluted to ½ l, 25.0 g of bentonite were added and the slurry was boiled for 1 hour, holding the pH constant at 4.75 with the addition of 3 percent $NH_4OH$ as required. The product was filtered, washed twice with ½ l of hot $H_2O$, then oven dried. After calcining 2 hours at 1000° F. and an 8 hour, 1250° F., 5 psi steam deactivation the excellent hydrothermal stability is reflected in the 244 $m^2/g$ surface area and the 86.8 percent conversion versus 80.0 for a standard commercial catalyst.

EXAMPLE 6

This example shows the stabilizing effect of using a metal complex polymer which is prepared by simultaneously hydrolyzing-polymerizing chlorhydrol while reacting the polymer with clay at high pH. 19.0 g chlorhydrol described in Example 1 were diluted to 500 ml. 25 g (dry basis) bentonite were added, and the slurry was hot aged for 1 hour at 150° F., holding the pH at 5.50 with dropwise addition of 3 percent $NH_4OH$ as needed. The slurry was filtered, washed twice with ½ l hot deionized $H_2O$ and then oven dried. The sample was ground, calcined 2 hours at 1000° F., steam deactivated (8 hours, 1250° F., 5 psi steam) and then tested in a microactivity test unit. The excellent hydrothermal stability is reflected in the 207 $m^2/g$ after hydrothermal treatment for 8 hours, 1250° F., 5 psi steam surface area and the 83.3 percent conversion level versus 80.0 percent conversion for a similarly deactivated commercial catalyst.

The following table summerizes and compares the physical properties and catalyst cracking activity of the pillared interlayered clay catalyst samples prepared in Examples 1 to 6. The microactivity of samples 1, 2, 3, 4, 5 and 6 was obtained at 900° F. 16 Weight hourly space velocity (WHSV), using a catalyst to oil ratio (c/o) of 3 after an 8 hour 1250° F., 5 psi steam deactivation. Sample 4 was tested at 900° F., 40 WHSV and 3 c/o. Initial surface area was determined subsequent to heating in air at 538° C. for 1 hour.

TABLE

| Sample (Example No.) | Metal Complex (Composition/mol wt.) | Surface Area (Initial m²/g) | Surface Area (Steamed m²/g) | Microactivity (% conversion) |
|---|---|---|---|---|
| 1 | chlorhydrol/1000 | 286 | 107 | 58.1 |
| 2 | chlorhydrol + NH$_3$/>3000 | 281 | 190 | 73.6 |
| 3 | chlorhydrol + Mg/>2000 | 302 | 219 | 78.4 |
| 4 | chlorhydrol & SiO$_3$/>3000 | 294 | — | 78.7 |
| 5 | chlorhydrol + SiO$_3$ & NH$_3$ pH 4.75/>5000 | 384 | 244 | 86.8 |
| 6 | chlorhydrol & NH$_3$ pH = 5.50 1 | 322 | 207 | 83.3 |

The above data clearly indicates that pillared interlayered clays prepared in accordance with the teachings of the present invention possess a superior degree of thermal stability and catalytic activity.

EXAMPLE 7

A metal complex polymer was obtained by reacting a zirconyl chloride solution containing sodium hydroxide. ½ l of 0.667M ZrOCl$_2$ was prepared and then 13.3 g NaOH dissolved in ½ l solution was added dropwise. After addition of all the NaOH, the solution was refluxed 24 hours to obtain a metal complex polymer having a molecular weight of above 2000. 120 ml portions of this solution were diluted to ½ l with D.I. H$_2$O and reacted with 10 g of clay for ½ hour at 150° F., filtered, washed and oven dried. Subsequent to calcining at 538° C. for 2 hours the sample was evaluated as a hydrocarbon cracking catalyst. The catalyst composition possessed an activity of 62 percent conversion.

EXAMPLE 8

In this example a mixture of AlCl$_3$.6H$_2$O and MgCl$_2$.6H$_2$O are dried at 250° F. for 18 hours to a 48 percent weight loss to produce a mixed Al-Mg polymer for interlayered smectite. 7.6 g AlCl$_3$.6H$_2$O and 2.54 g MgCl$_2$.H$_2$O were dissolved in 25 ml deionized water and then dried at 250° F. for 18 hours. The dried salt mixture was dissolved in 250 ml deionized water, 12.5 g dry basis bentonite added, the slurry hot aged 1 hour at 150° F., filtered, washed twice with 250 ml hot deionized water and dried at 250° F. The interlayered clay product had a surface area of 254 m²/g and a basal spacing of 17.7 A°.

EXAMPLE 9

This example indicates that interlayered smectites prepared by chlorhydrol+Mg$^{+2}$ coreaction are more hydrothermally stable than those prepared with chlorhydrol reaction alone. 54.4 g chlorhydrol was diluted to 1.6 l and then 400 ml of a solution containing 40.8 g MgCl$_2$.6H$_2$O was added and the mixture aged 3 days at room temperature. 100 g dry basis of bentonite was added, the slurry hot aged 1 hour at 160° F., filtered, washed twice with 1.0 l hot deionized water and oven dried. As indicated below, this preparation maintained a greater degree of surface area after a 6 hour, 1400° F., 1 atmosphere steam treatment than smectite interlayered with chlorhydrol alone.

| Interlayering Species | Surface Area 1-1000° F. | Surface Area 6-1400° F., 1 Atm. |
|---|---|---|
| Chlorhydrol | 270 | 20 |
| Chlorhydrol + Mg$^{+2}$ | 310 | 104 |

EXAMPLE 10

This example shows that ZrOCl$_2$.4H$_2$O solutions treated with Na$_2$CO$_3$ can effectively interlayer smectites. 125 g ZrOCl$_2$.4H$_2$O was dissolved in ½ l solution. To this solution was added dropwise ½ l of solution containing 26.5 g Na$_2$CO$_3$. After aging for 24 hours, 50 ml of the above solution was diluted to ½ l, 10 g dry basis, clay added, the slurry hot aged half an hour at 150° F., filtered, washed twice with ½ l hot deionized water and oven dried. The product had a surface area of 309 m²/g and a basal spacing of 17.4 A°.

EXAMPLE 11

This example shows that diluted chlorhydrol, when refluxed, gives interlayered smectites with improved hydrothermal stability relative to nonrefluxed chlorhydrol. 217 g chlorhydrol was diluted to 1.0 l, yielding a solution which is 0.5 M as Al$_2$O$_3$. This solution was refluxed for 96 hours. 87.6 ml of this solution was diluted to 400 ml, 25 g dry basis bentonite added, the slurry boiled 1 hour, filtered, washed twice with ½ l hot deionized water and oven dried. As indicated below, this preparation had a greater retention of surface area than an interlayered clay prepared with ordinary chlorhydrol.

| Interlayering Species | Surface Area 1-1000° F. | Surface Area 6-1400° F., 1 Atm. |
|---|---|---|
| Chlorhydrol | 270 | 20 |
| Refluxed diluted chlorhydrol | 271 | 82 |

EXAMPLE 12

This example shows that treatment with SiO$_3$$^{-2}$ of either diluted refluxed chlorhydrol or ordinary chlorhydrol results in a substantial improvement of the interlayered product. 43.8 ml of diluted (0.5 M in Al$_2$O$_3$) refluxed (48 hours) chlorhydrol was diluted further to 500 ml. 1.26 g of Na$_2$SiO$_3$ solution (containing 28.5 percent SiO$_2$ and 8.0 percent Na$_2$O) diluted to 100 ml was added to the refluxed chlorhydrol solution. 12.5 g dry basis bentonite was added, the slurry boiled 1 hour, filtered, washed twice with ½ l hot deionized water and oven dried.

Summarized below is a comparison of the hydrothermal stability of both of the above interlayered clays with ordinary chlorhydrol interlayered clay.

| Interlayering Species | Surface Area 1-1000° F. | Surface Area 6-1400° F., 1 Atm. |
|---|---|---|
| Chlorhydrol | 270 | 20 |

-continued

| Interlayering Species | Surface Area | |
|---|---|---|
| | 1-100° F. | 6-1400° F., 1 Atm. |
| Chlorhydrol + $SiO_3{}^{-2}$ | 294 | 129 |
| Refluxed diluted chlorhydrol + $SiO_3{}^{-2}$ | 353 | 165 |

We claim:

1. In a method for preparing a pillared interlayered smectite clay product wherein a smectite clay is reacted with a mixture of a polymeric cationic hydroxy metal complex and water to obtain a pillared, interlayered smectite having greater than 50 percent of its surface area in pores of less than 30 A° in diameter after dehydration, the improvement comprising reacting said smectite with a high molecular weight cationic hydroxy metal complex and copolymers thereof having a molecular weight of from about 2000 to 20,000.

2. The method of claim 1 wherein said high molecular weight complex is obtained by heating a polymeric cationic hydroxy metal complex having an initial molecular weight of from about 600 to 1200 at a temperature of from about 50° to 100° C. for 0.1 to 24 hours.

3. The method of claim 1 wherein said high molecular weight complex is obtained by reacting a polymeric cationic hydroxy zirconium complex having an initial molecular weight of from about 600 to 1200 at a pH of from about 0.5 to 2.0 for about 0.1 to 24 hours.

4. The method of claim 1 wherein said high molecular weight complex is obtained by reacting a polymeric cationic hydroxy aluminum complex having an initial molecular weight of from about 600 to 1200 at a pH of from about 3.5 to 6 for about 0.1 to 24 hours.

5. The method of claims 3 or 4 wherein said reaction is conducted in the presence of a base selected from the group consisting of ammonium and alkali metal hydroxides and carbonates and magnesium.

6. The method of claim 1 wherein said high molecular weight complex is obtained by copolymerizing a polymeric cationic hydroxy metal complex with a copolymerizing reactant selected from the group consisting of silicate and borate.

7. The method of claim 6 wherein from about 0.05 to 1.0 mols of copolymerizing reactant are reacted with each mol of metal complex.

8. The methods of claims 2 or 6 wherein said polymeric cationic hydroxy metal complex is selected from the group consisting of aluminum and zirconium complexes.

9. An interlayered smectite clay product prepared by the method of claim 1.

10. A hydrocarbon conversion catalyst comprising the product of claim 8.

11. A selective sorbent comprising the product of claim 8.

* * * * *